2,534,575

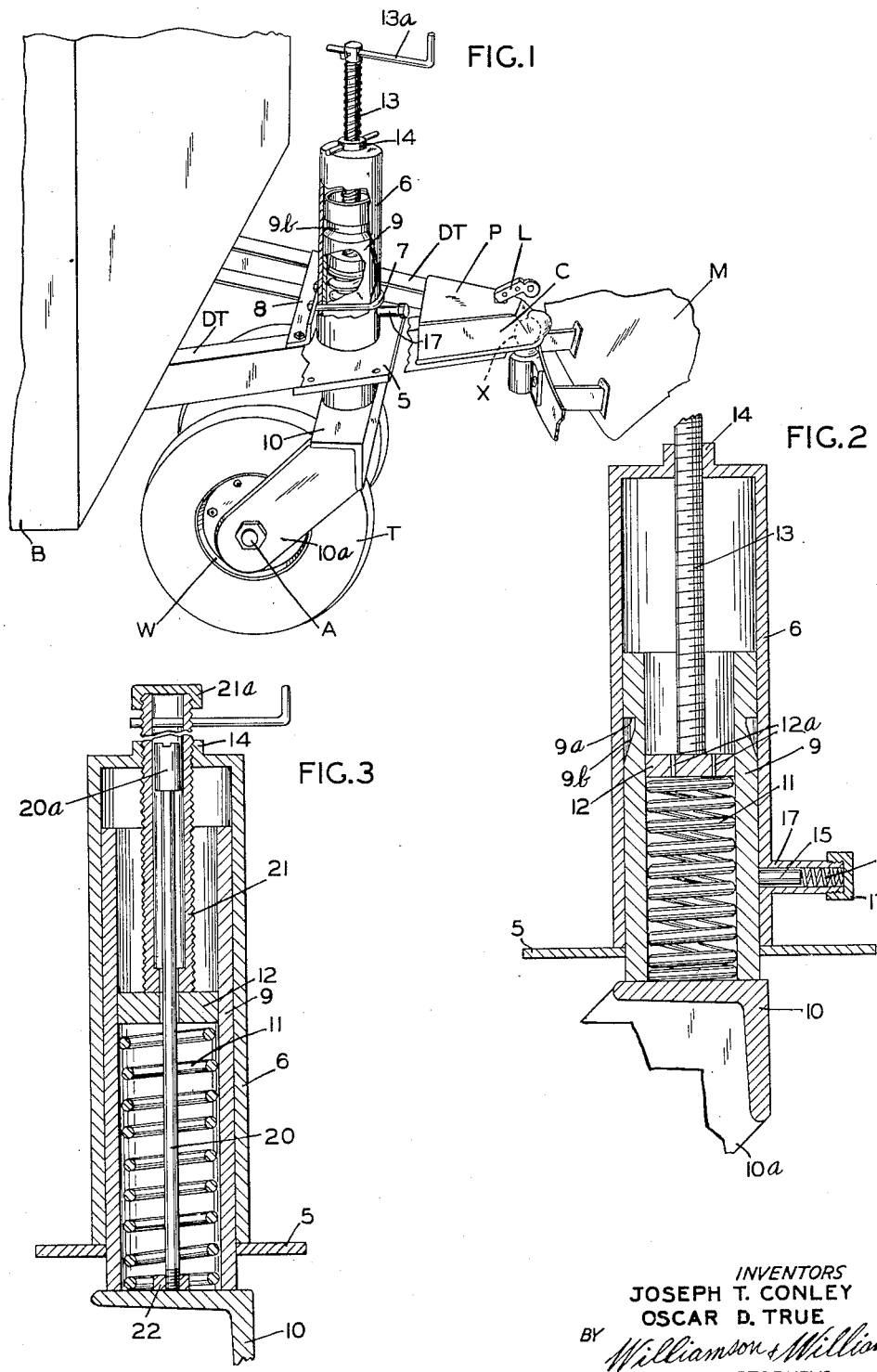
Dec. 19, 1950   J. T. CONLEY ET AL   2,534,575
DOLLY FOR HOUSE TRAILERS
Filed March 12, 1948
INVENTORS
JOSEPH T. CONLEY
OSCAR D. TRUE
BY Williamson & Williamson
ATTORNEYS Patented Dec. 19, 1950

UNITED STATES PATENT OFFICE 2,534,575

DOLLY FOR HOUSE TRAILERS

Joseph T. Conley and Oscar D. True, Minneapolis, Minn.

Application March 12, 1948, Serial No. 14,486

4 Claims. (Cl. 280—33.44)

This invention relates to house trailer dollies and is an improvement in certain respects, on the structure disclosed in our co-pending application, Serial Number 636,555, now Patent No. 2,463,746, issued March 8, 1946, wherein an efficient trailer dolly is disclosed for partially supporting and stabilizing the front end of a trailer vehicle while in travel along a highway, as well as when the trailer is detached from the tractor vehicle.

It is an object of our present invention to provide an efficient trailer dolly wherein adjustment within quite an extended range for stabilization resistance and varying proportional support of the trailer load may be quickly made with the further advantage of elevating and lowering the coupling element at the front end of the trailer to facilitate coupling and uncoupling with a motor vehicle.

A further object is the provision of an efficient trailer dolly of the class described wherein an intermediately disposed, wheeled truck of the caster type is utilized, having full bearing surface between its king post or stabilizing sleeve and a mounting sleeve on the trailer for receiving the same and having a positive locking mechanism which while permitting relative longitudinal movement between king post and mounting sleeve, positively prevents separation of said parts due to extreme jolts or other conditions in use.

Another object is the provision of an improved trailer dolly particularly applicable to house trailers for partially supporting the forward end of the trailer during travel and for fully supporting said trailer end after the trailer is uncoupled from the towing vehicle which employs hydraulic cushioning means advantageously in combination with spring cushioning means and wherein the elements are so related that there is no chance for leakage of the hydraulic fluid during use and still a very full and durable bearing surface is provided between telescopic parts of the dolly construction.

These and other objects and advantages of our invention will be more apparent from the following description made in connection with the accompanying drawings wherein like reference characters refer to similar parts throughout the several views and in which:

Fig. 1 is a fragmentary, perspective view showing an embodiment of our invention applied to the front end or draft connection of a trailer vehicle and coupled to a motor vehicle for towing;

Fig. 2 is a vertical section taken almost axially of the king post of the dolly truck and the tubular mounting for receiving the same and showing also, the closely related parts;

Fig. 3 is a similar vertical construction showing a somewhat different form of our invention.

Referring now to Figs. 1 and 2, we illustrate an embodiment of our trailer dolly applied to the draft tongue of a conventional type of house trailer having a body B supported on a suitable chassis, the heavy horizontal stringer or frame members of which converge at the front of the trailer to form a V-shaped draft tongue DT, the apex of which is reinforced and connected together by a heavy metal plate P. A ball-receiving coupling member C of conventional structure is provided at the front of the draft tongue having a lever-operated locking element L associated therewith for coupling and locking with the upstanding ball X carried at the rear of a motor vehicle or other tractor vehicle M.

We provide a heavy platform plate 5 of trapezoidal configuration, as shown, underlying and bolted to the two frame members of the draft tongue DT. An upstanding mounting sleeve 6 extends at its lower end through the platform plate 5 and is welded or otherwise rigidly secured thereto and as shown, is further reinforced by means of a heavy embracing U-bolt 7 which surrounds the intermediate, upstanding portion of sleeve 6 and has its ends rigidly secured by nuts to the upstanding vertical flange of an angle bracket 8 traversing the channel members of the draft tongue just rearwardly of the mounting sleeve.

Within the mounting sleeve 6, we provide a longitudinally slidable and oscillatory stabilizing sleeve or swivel 9, having a cylindrical periphery telescopically fitted with close working clearance within the mounting sleeve 6 and closed at its lower end by sealed connection through welding or otherwise with an angle bolster 10 comprising a part of the dolly truck. The interior of the closed stabilizing sleeve 9 constitutes a well for holding hydraulic fluid as well as for containing a supporting spring 11 which works in the oil or other hydraulic fluid within the well.

The truck bolster 10 as shown, is provided with a pair of rearwardly and downwardly aligned spaced legs 10a rigidly fixed thereto and between which one or two pneumatically cushioned wheels W are journalled on a stub axle A bolted or otherwise secured to said legs. The wheels W are of heavy truck type, carrying as shown, large preferably pneumatic tires T. The said wheels and tires T through the inner relation of the legs 10a of the dolly truck and the relation of mounting sleeve 6 and stabilizing sleeve 9, provide a caster action in movement of the trailer over the ground.

The entire shock-absorbing and supporting mechanism is mounted within the well defined by the interior of stabilizing sleeve 9 and includes, in addition to the compression coil spring 11, an adjustable abutment piston 12 closely fitting the inner cylindrical surface of said stabilizing sleeve and preferably having liquid passage ports 12a therethrough. Piston 12 is secured to the lower end of a depending screw shaft 13 which has threaded engagement at its intermediate portion with an internally threaded collar 14 which is rigidly fixed or integrally constructed with the closed upper end of the mounting sleeve 6. A crank handle 13a is affixed to the upper and projecting end of the screw shaft 13 to facilitate turning of said shaft and consequent adjustment of the abutment piston 12 and compression spring 11.

It will be seen that the stabilizing or swivel sleeve 9, throughout most of its peripheral or cylindrical surface is journalled within the mounting sleeve 6 and may reciprocate longitudinally therein as well as oscillate freely on a vertical axis. A locking shoulder 9a however is formed in the upper portion of stabilizing sleeve 9 by machining or otherwise forming an annular channel in a zone of said sleeve, said channel as shown, having the flat horizontal flange constituting the shoulder 9a and having adjacent said flange, an annular channel 9b which is formed by tapering the stock externally of sleeve 9 in a zone extending upwardly to the annular flange 9a. A spring pressed locking bolt 15 is adapted to cooperate with the channel 9b and shoulder 9a during an extreme displaced position of the two sleeves 6 and 9, said bolt or latch plunger 15 being slidably mounted in a suitable socket or tube 17 which is affixed to the lower portion of the mounting sleeve 6 and which is in communication with the interior of said sleeve in order that bolt 15 may be urged constantly with light tension by a coil spring 18 against the cylindrical outer wall of the stabilizing sleeve 9. The tubular socket 17 is closed at its outer end, as shown, by a threaded cap member 17a.

In operation, the well within stabilizing sleeve 9 and containing the shock absorbing and supporting mechanism is filled with suitable oil or other hydraulic fluid to a level a few inches below the open upper end of sleeve 9.

In travel with the trailer coupled to the tractor vehicle M and with piston 12 adjusted as desired to relieve the hitch coupling on vehicle M from a desired proportion of the weight of the front end of the trailer, the trailer may be drawn at high speed over a road and the shocks and impacts due to unevenness of the road surface (transmitted through the dolly wheels W as well as through the coupling of the motor vehicle) are taken up and absorbed through the somewhat compressed coil spring 11 and through the hydraulic cushioning mechanism. The hydraulic mechanism serves to cushion shocks in the up and down movement of piston 12 within the well, the hydraulic fluid passing through the ports 12a of the piston. The caster action of the dolly during travel substantially eliminates side sway of the front end of the trailer, thereby materially reducing the strain upon the towing vehicle and the coupling connections.

A very full bearing surface between the upstanding king post or stabilizing sleeve 9 and the upstanding mounting sleeve 6, is present, making our structure strong and durable and capable of withstanding severe jolts and strain.

With our improved construction, there is no danger of the mounting sleeve 6 and stabilizing sleeve or king post 9 ever becoming displaced in extreme jolts due to travel, since when substantial displacement takes place between said members, the latch bolt or lock 15 abuts against the shoulder 9a, constituting a positive lock or retainer for the telescoped parts. This is accomplished without any material weakening of the inherent structure or without materially lessening the substantial amount of bearing surface between sleeves 6 and 9.

With our structure, any proportion of the weight of the front end of the trailer may be borne by the dolly and taken off of the rear coupling of the motor vehicle. Adjustment may be readily effected by turning of the piston-supporting screw 13 to vary the tension upon supporting spring 15.

The lower the piston is disposed within the well formed by stabilizing sleeve 9, the more of the weight of the trailer vehicle is borne during travel by the wheels W of the dolly.

When it is desired to uncouple the trailer, no manual lifting of the tongue is required with our structure. It is only necessary after releasing the coupling lock mechanism to adjust the piston-operating screw 13 downwardly until the coupling element C fixed to the tongue of the trailer is raised above the cooperating coupling ball X of the motor vehicle. The entire weight of the front end of the trailer is then supported upon our dolly structure and because of the efficient caster action of the truck and wheels, it may be maneuvered by hand or manual pushing force in either forward, side or rearward directions.

In recoupling the trailer to the towing vehicle, the tongue of the trailer is properly aligned vertically with the coupling element or ball of the towing vehicle and adjustment screw 13 is then turned to gradually raise the piston 12 and consequently, lower coupling element C into engagement with the ball or other element X of the towing vehicle.

When the wheels of the dolly receive a shock through a bump or recess in the highway surface, the same is transmitted to the coil spring 5, cushing the shock while permitting a relative movement between the stabilizing sleeve 9 and the mounting sleeve 6. This relative movement is further cushioned by the hydraulic action of the fluid passing through the restricted passages in or around the circumferential edge of piston 12.

It will be understood that our device is operative without the use of the hydraulic cushioning media since an air cushion is provided when no hydraulic fluid is used between the lower end of the well formed by sleeve 9 and the piston 12.

In Fig. 3, a somewhat different embodiment of the invention is illustrated, utilizing even a fuller bearing surface between the stabilizing sleeve 9 and the mounting sleeve 6 than in the form first described. Here, the abutment piston 12 operating against the coil spring 11 is axially apertured to receive an abutment rod 20 and is attached or rigidly connected with the lower end of a tubular depending adjustment screw 21. Adjustment screw 21 is externally threaded and has threaded engagement with a collar 14 fixed to the upper and closed end of the mounting sleeve 6.

The upper end of the depending adjustment screw 21 may be closed by a threaded cap 21a which may be removed when it is desired to disassemble the device.

The abutment rod 20 at its upper end carries an enlarged abutment head 20a which is adapted at its lower edge to contact the lower end of tubular screw 21 internally thereof. It is of course, understood that the lower closed end of the tubular member 21 is drilled to freely receive the rod 20, but to form an aperture of less diameter than the diameter of the enlarged abutment head 20a. The lower end of the abutment rod 20 is screw threaded or otherwise affixed to an internally threaded collar or lug 22, welded or otherwise rigidly secured to the dolly bolster 10 and disposed centrally of the well formed by stabilizing sleeve 9.

The operation of the second form of our invention described, is generally similar to that of the form first described, the adjustment of the shock absorbing means being similar through variance of the position of piston 12 by turning of the screw 21. Stabilizing sleeve 9 has an unbroken cylindrical surface in sliding and oscillatory bearing contact with the interior of the mounting sleeve 6. The sleeves 6 and 9 are locked against telescopic displacement by means of the abutment rod 20 with its abutment head 20a and the cooperating lower and restricted end of the screw 21. Displacement of hydraulic fluid, it will be noted, occurs materially through the clearance passage or passages between the rod 20, the piston 12 and the lower end of screw sleeve 21, hydraulic fluid during upward movement of the stabilizing sleeve 9 being injected within the tubular screw 21.

It will of course, be understood that various changes may be made in the form, details, arrangement and proportions of the parts without departing from the scope of our invention.

What we claim is:

1. A swiveled and shock-cushioning wheel mounting for trailers comprising a wheeled truck having an upstanding swivel sleeve open at its upper end, a mounting sleeve adapted to be secured to one end of a trailer and having external telescopic relation with said swivel sleeve and provided with a lower open end, a piston fixed to the upper portion of said mounting sleeve and working within said swivel sleeve, shock-cushioning means interposed between said piston and the lower end of said swivel sleeve, said swivel sleeve having a cylindrical external surface bearing directly against the internal surface of said mounting sleeve and locking mechanism for preventing said sleeve from becoming telescopically uncoupled, said locking mechanism including an annular shouldered element adjacent the upper portion of said swivel sleeve and fixed to said sleeve and a cooperating locking element carried by said mounting sleeve.

2. A swiveled and shock-cushioning wheel mounting for trailers comprising a caster truck having an upstanding swivel sleeve open at its upper end and closed at its lower end to form a well, a vertical mounting sleeve adapted to be secured to the forward end of a trailer and having external telescopic relation with said swivel sleeve and provided with a lower open end, a piston fixed within the upper end of said mounting sleeve and working in said swivel sleeve, cushioning means interposed between said piston and the lower closed end of said swivel sleeve, said swivel sleeve having a cylindrical external surface bearing directly against the internal surface of said mounting sleeve and locking mechanism for preventing said sleeves from becoming telescopically uncoupled, said locking mechanism including a horizontally and annularly shouldered element fixed to said swivel sleeve and a cooperating locking element carried by said mounting sleeve, said elements being normally spaced apart but adapted to abut when substantial longitudinal displacement between said sleeves takes place.

3. A swiveled and shock-cushioning wheel mounting for trailers comprising a truck having an upstanding swivel sleeve open at its upper end and closed at its lower end to form a well, a mounting sleeve adapted to be secured to one end of a trailer and having external telescopic relation with said swivel sleeve and provided with a lower open end, a piston fixed to the upper end of said mounting sleeve and working in said swivel sleeve, a coil spring interposed between said piston and the lower closed end of said swivel sleeve, said swivel sleeve having a full height, cylindrical external surface bearing directly against the internal cylindrical surface of said mounting sleeve and locking mechanism for preventing said swivel sleeve and mounting sleeve from becoming telescopically uncoupled, said locking mechanism including an annularly shouldered element fixed to said swivel sleeve and a cooperating locking element projectible from said mounting sleeve, said elements being normally spaced apart but capable of abutment when substantial longitudinal displacement between said sleeves takes place.

4. A swiveled and shock-cushioning wheel mounting for trailers comprising a wheeled truck having an upstanding swivel sleeve open at its upper end, a mounting sleeve adapted to be secured to one end of a trailer and having external telescopic relation with said swivel sleeve and provided with a lower open end, a piston fixed to the upper portion of said mounting sleeve and working within said swivel sleeve, shock-cushioning means interposed between said piston and the lower end of said swivel sleeve, said swivel sleeve having a cylindrical external surface bearing directly against the internal surface of said mounting sleeve and locking mechanism for preventing said sleeve from becoming telescopically uncoupled, said locking mechanism comprising a circumferential shoulder formed by a groove in the upper portion of said swivel sleeve and a spring pressed pin mounted in the lower portion of said mounting sleeve and projectible against the periphery of said swivel sleeve.

JOSEPH T. CONLEY.
OSCAR D. TRUE.

REFERENCES CITED

The following references are of record in the file of this patent:

UNITED STATES PATENTS

| Number | Name | Date |
| --- | --- | --- |
| 745,803 | Edeline | Dec. 1, 1903 |
| 2,347,524 | Swan | Apr. 25, 1944 |